US012627719B1

(12) United States Patent
Desai et al.

(10) Patent No.: US 12,627,719 B1
(45) Date of Patent: *May 12, 2026

(54) SYSTEM AND METHOD FOR EFFECTIVE COMMUNICATION IN ONLINE COLLABORATION

(71) Applicant: United Services Automobile Association (USAA), San Antonio, TX (US)

(72) Inventors: Snehal Desai, Richardson, TX (US); Stacy Callaway Huggar, San Antonio, TX (US); Noe Alberto Martinez, San Antonio, TX (US); Kristina Suniga-Cabrera, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/658,002

(22) Filed: May 8, 2024

Related U.S. Application Data

(63) Continuation of application No. 17/696,573, filed on Mar. 16, 2022, now Pat. No. 12,015,653.

(60) Provisional application No. 63/164,089, filed on Mar. 22, 2021.

(51) Int. Cl.
*H04L 65/401* (2022.01)

(52) U.S. Cl.
CPC ............................... *H04L 65/4015* (2013.01)

(58) Field of Classification Search
CPC .................................................. H04L 65/4015
See application file for complete search history.

(56) References Cited

U.S. PATENT DOCUMENTS

| | | | |
|---|---|---|---|
| 10,360,894 B1 | 7/2019 | Rakshit et al. | |
| 2005/0032539 A1* | 2/2005 | Noel ..................... | H04W 72/56 |
| | | | 455/518 |
| 2005/0078613 A1 | 4/2005 | Covell et al. | |
| 2011/0043602 A1 | 2/2011 | Lee | |
| 2012/0331401 A1 | 12/2012 | Tipirneni | |
| 2013/0022189 A1 | 1/2013 | Ganong, III et al. | |
| 2017/0353508 A1 | 12/2017 | Yoakum | |
| 2019/0147367 A1 | 5/2019 | Bellamy et al. | |
| 2020/0219216 A1 | 7/2020 | Davis et al. | |
| 2022/0182428 A1 | 6/2022 | Roedel et al. | |
| 2023/0208979 A1* | 6/2023 | Harris .................. | G06V 40/176 |
| | | | 348/14.03 |

* cited by examiner

*Primary Examiner* — Lesa M Kennedy
(74) *Attorney, Agent, or Firm* — Fletcher Yoder, P.C.

(57) ABSTRACT

A system for managing an online meeting includes one or more hardware processors. The system also includes a non-transitory memory, the non-transitory memory storing instructions that, when executed by the one or hardware processors, causes the one or more hardware processors to perform actions. The actions include monitoring participants during the online meeting. The actions also include adjusting interaction between a least a subset of the participants via one or more interfaces based on the monitoring.

20 Claims, 4 Drawing Sheets

PARTICIPANTS

MAIN CONVERSATION

PERSON A PERSON C PERSON E

PERSON F

SIDE BAR

PERSON B

PERSON D

SYSTEM AND METHOD FOR EFFECTIVE COMMUNICATION IN ONLINE COLLABORATION

CROSS-REFERENCE TO RELATED APPLICATION

This application is a continuation of U.S. Non-Provisional patent application Ser. No. 17/696,573, entitled "SYSTEM AND METHOD FOR EFFECTIVE COMMUNICATION IN ONLINE COLLABORATION," filed Mar. 16, 2022, which claims priority to and the benefit of U.S. Provisional Patent Application No. 63/164,089, entitled "SYSTEM AND METHOD FOR EFFECTIVE COMMUNICATION IN ONLINE COLLABORATION", filed Mar. 22, 2021, which are herein incorporated by reference in their entirety.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

With the development of technology, online collaboration utilizing videotelephony or videoconferencing has become more prevalent (e.g., utilizing software applications on electronic devices). However, online collaborations suffer from deficiencies when compared to in-person meetings. For example, side bar conversations between participants, talking over other participants, and segmented conversation sharing may all occur. In addition, certain participants may become less engaged during an online meeting. Therefore, there is a need to reduce these deficiencies.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system for managing an online meeting includes one or more hardware processors. The system also includes a non-transitory memory, the non-transitory memory storing instructions that, when executed by the one or hardware processors, causes the one or more hardware processors to perform actions. The actions include monitoring participants during the online meeting. The actions also include adjusting interaction between a least a subset of the participants via one or more interfaces based on the monitoring.

In one embodiment, a computer-implemented method includes monitoring, via a processor, participants during an online meeting. The method also includes adjusting, via the processor, interaction between at least a subset of the participants based on the monitoring, wherein adjusting the interaction between at least the subset of participants comprises designating the subset of participants as a side bar conversation by altering one or more user interfaces on respective computing devices of participants to indicate the side bar conversation between the subset of participants.

In one embodiment, one or more non-transitory computer-readable media encoding one or more processor-executable routines, wherein the one or more routines, when executed by a processor, cause acts to be performed. The acts include adjusting interaction between at least a subset of the participants based on the monitoring, wherein adjusting the interaction between at least the subset of participants comprises designating the subset of participants as a side bar conversation by altering one or more user interfaces on respective computing devices of participants to indicate the side bar conversation between the subset of participants.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
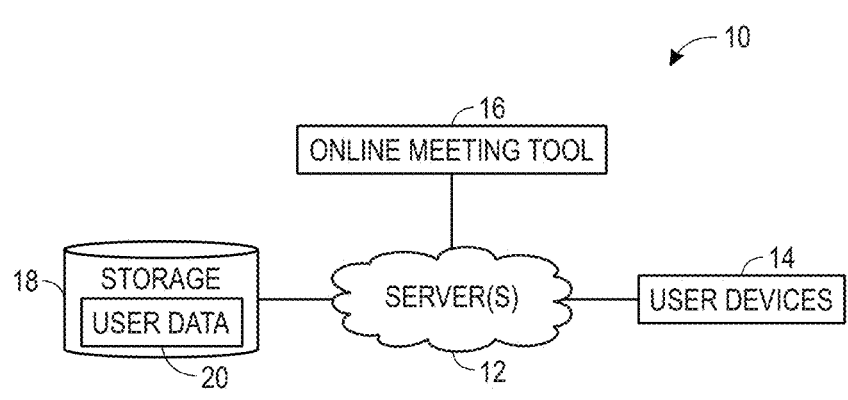
FIG. 1 illustrates a schematic diagram for an online collaboration system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

The present embodiments provide systems and methods for effective communication in online collaboration. In certain embodiments, an online collaboration tool may enable one or more subsets of participants to enter private side bar conversations separate from the main conversation to minimize disturbance of the main conversation. These side bar conversations may be instigated by the participants or instigated by the online collaboration tool based on monitoring of the participants. In certain embodiments, the online collaboration tool may facilitate turn-taking during an online collaboration by designating the order of the speakers based on participant preferences and/or the monitoring of the participants. These techniques ensure that the online collaboration proceeds with minimal interruptions while minimizing talking over and/or segmented conversation sharing.

Aspects of the present disclosure are described below with reference to flowchart illustrations and/or block diagrams of methods, apparatuses, systems, and/or computer program products according to implementations of the present disclosure. It should be understood that each block of the flowchart illustrations and/or block diagrams, and combinations of blocks in the flowchart illustrations and/or block diagrams, may be implemented by computer program instructions. These computer program instructions may be provided to processing circuitry of a general-purpose computer, special-purpose computer, or other programmable data processing apparatus (e.g., remote server, a server running a virtual machine, and so forth) of a machine, such that the instructions, which execute via a processor of the computer or other programmable data processing apparatus, implement the functions/acts specified in the flowchart and/ or block diagram block or blocks.

FIG. 1 illustrates a block diagram of an online collaboration system 10 in accordance with present embodiments. The system 10 may include server 12 (e.g., one or more servers of a cloud computing environment), user devices 14, an online meeting (e.g., videotelephony or videoconference) tool 16, and user data storage 18, e.g., a database, where user data 20 may be stored. The server 12, user devices 14, online meeting tool 16, and user data storage 18 may communicate with each other using a variety of communication protocols. The communication protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The server 12 may be a server operated by a third-party organization. For example, the server 12 may be a private server, such as local area network (LAN) that includes a variety of computing and server devices including, but not limited to, switches, servers (e.g., processors), storage (e.g., memory) and routers. Further, the server 12 may be a cloud-based server. The server 12 may include restrictions and access rules established in order to relegate access to selected users (e.g., clients, employees, third party service providers). The organization may use the server 12 to provide a variety of services for the clients. In some embodiments, the server 12 may actually be off premises (e.g., in a cloud or the like). The server 12 may include service/ application servers, data servers, databases, and other server devices such as gateways, switches and routers.

The online meeting tool 16 may operate as a software application on the user device 14 or a web browser mediated application.

Figure 2:
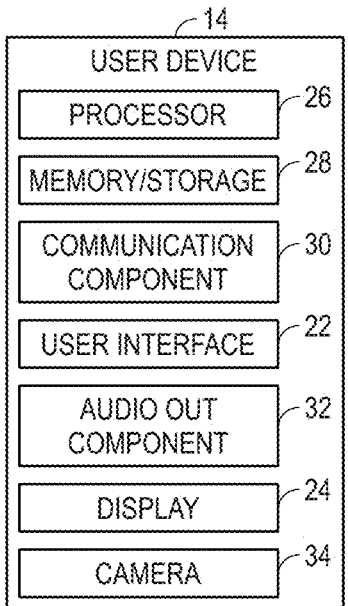
FIG. 2 illustrates a block diagram of a user device of the system in FIG. 1, in accordance with embodiments described herein.

FIG. 2 is a block diagram of an embodiment of a user device 14 of the system 10 in accordance with present embodiments. A user may access and/or interact with the online meeting tool 16 operating on the user device 14 via a user interface 22, such as a graphical user interface (GUI) or via an audio command interface that facilitates interaction (e.g., audio user inputs, audio device feedback) with the user device 14. The user device 14 may include a display 24, which displays the GUI. In certain embodiments, the display may enable user input (e.g., via a touchscreen). A user device 14 may include various types of components that may assist the user device 14 in performing various types of computing tasks and operations. For example, a user device 14 may be any electronic device comprising at least a processor 26, a memory/storage 28, a communication component 30, the user interface 22, an audio output component 32 (e.g., speaker), a camera 34, or any combination thereof. Further, it should be understood that certain components of the user device 14 depicted in FIG. 2, such as the processor 26, the memory 28, the communication component 30, the user interface 22, and the audio output component 32 may be present in other components of the system 10.

The processor 26 of the user device 14 may be any type of computer processor or microprocessor capable of executing computer-executable code. The processor 26 may also include multiple processors that may perform the operations described below.

The memory 28 component may be any suitable articles of manufacture that can serve as media to store processor-executable code, data, or the like. These articles of manufacture may represent computer-readable media (e.g., any suitable form of memory or storage) that may store the processor-executable code used by the processor 26 to perform the presently disclosed techniques. As used herein, applications may include any suitable computer software or program that may be installed onto the user device 14 and executed by one or more processors 26 of the user device 14. It should be noted that non-transitory merely indicates that the media is tangible and not a signal.

The online meeting tool 16 may be downloaded and stored in the memory 28 of the user device 14 or may be stored at least in part on the server 12 and accessed via the user device 14. User preferences (e.g., related to the online meeting tool 16) as disclosed herein may also be stored in the memory 28 of the user device 14.

The user device 14 may comprise a communication component 30 that may be configured to communicate with the server 12. The communication component 30 may facilitate communication between the user device 14 and the server 12 via a communication network such as the Internet, or the like. The server 12 may communicate with the data storage 18 to access user data 20 (see FIG. 1). The user data 20 may include a user's previous passwords or alphanumeric pins (e.g., related to the online meeting tool 16). The user data 20 may also include preferences related to the online meeting tool 16 as described in greater detail below. The user data 20 may also include user personal data, such as data stored in the cloud or stored locally and accessible by the system 10.

The user device 14 may also operate to display the user interface 22 and permit user actions, such as user input, to the user interface 22. The user interface 22 may present graphics to the user as shown and described below. Along with displaying the user interface 22, the user device 14 may also present the same information that is presented via graphic, as described above, through an audio output component 32.

The user device 14 may include a tracking system that includes a tracking module (e.g., software or program) stored within the memory 28 that utilizes the camera 34 to track eye movement of the user for utilization with the online meeting tool as described below. The user device 14 may also include a body language interpretation system that includes a body language interpretation module (e.g., software or program) stored within the memory 28 that utilizes the camera 34 to monitor a participants face and body language for utilization with the online meeting tool as described below.

Figures 3, 4:
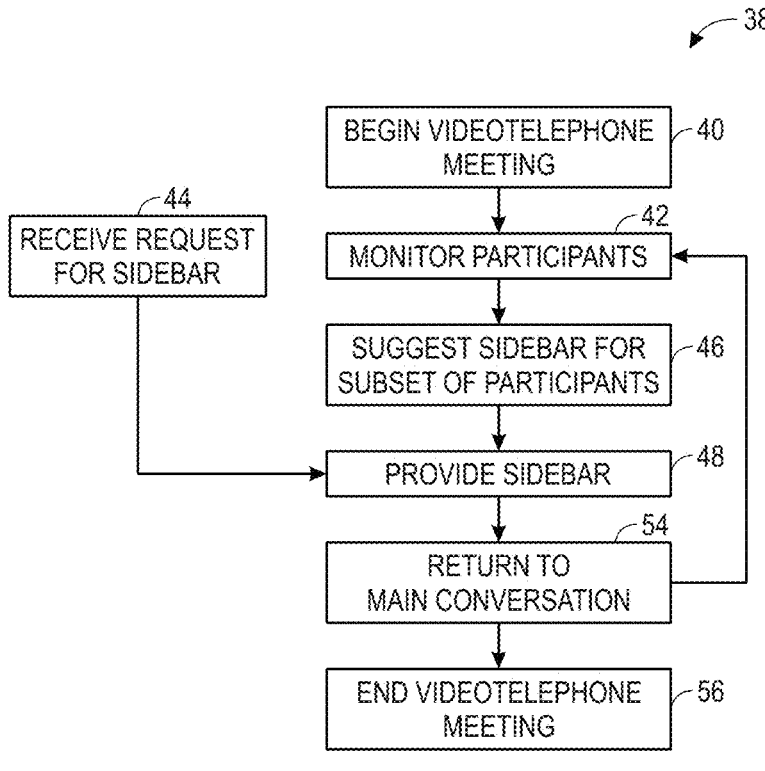
FIG. 3 illustrates a flow diagram of a method for promoting effective communication in an online collaboration, in accordance with embodiments described herein.
FIG. 4 illustrates a screen or graphical user interface on a participant's computing device designating participants in a main conversation and a side bar conversation (e.g., with the main conversation emphasized), in accordance with embodiments described herein.

FIG. 3 illustrates a flow diagram of a method 38 for promoting effective communication in an online collaboration in accordance with present embodiments. One or more steps of the method 38 may be carried out by one or more components of the system 10 illustrated in FIG. 1. One or more of the steps may be performed simultaneously or in a different order from the order shown in FIG. 3. The method 38 includes beginning a videotelephony or videoconference meeting (block 40). For example, multiple participants will join a meeting via the online collaboration tool (e.g., video-telephony or videoconference application) on their respective user devices (e.g., computing devices). The method 38 includes monitoring the participants (block 42). For example, a tracking system may be utilized to track the eyes of the participants (via a camera on the computing device). The software of the tracking system can determine which other participant a participant is talking to based on who they are looking at on the screen. The tracking system may also be utilized to monitor facial expressions or body language. In certain embodiments, monitoring the participants may determine a magnitude of discussion between particular participants. For example, two or more participants may engage in a conversation that has continued for an extended period of time or has consumed a certain percentage of the overall conversation.

The method 38 includes a participant receiving a request (via the online collaboration tool) for a side bar conversation (e.g., private conversation) (block 44). For example, a request may appear on the screen of a participant's computing device for entering a side bar conversation. The request may be initiated (via the online collaboration tool) by a participant wanting to engage another participant in the side bar conversation. In certain embodiments, the request may be initiated (via the online collaboration tool) by another participant wanting another subset of participants to engage in the side bar conversation so that the main conversation can continue.

The method 38 also includes the online collaboration tool automatically suggesting a side bar conversation to a subset of participants (block 46). Each participant of the subset of participants receives a request or suggestion on the screen of their respective computing device. The suggestion may be automatically provided based on the monitoring of the participants (e.g., eye tracking, facial expression, body language, magnitude of conversation between select participants, etc.).

Figure 5:
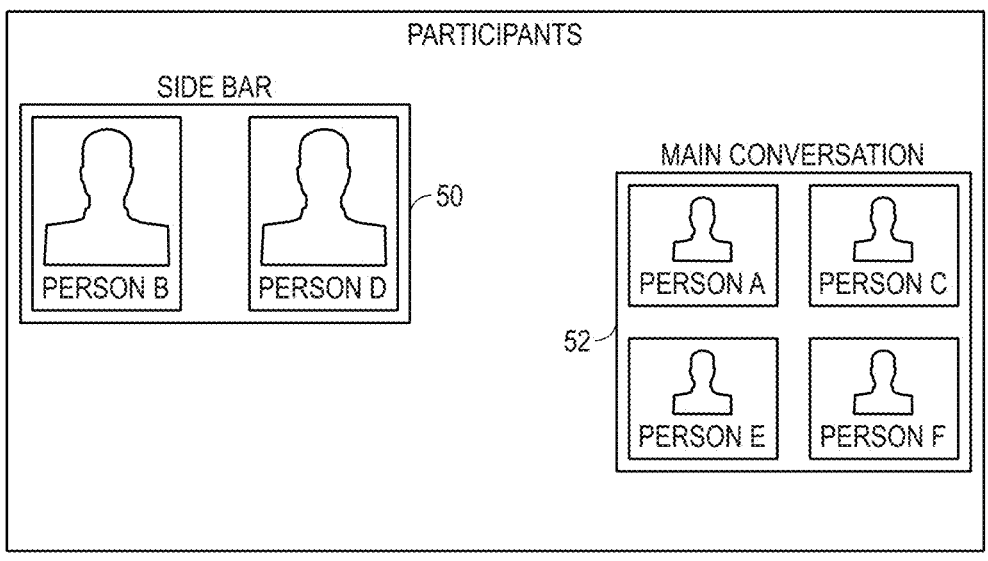
FIG. 5 illustrates a screen or graphical user interface on a participant's computing device designating participants in a main conversation and a side bar conversation (e.g., with the side bar conversation emphasized), in accordance with embodiments described herein.

The method 38 further includes providing the side bar conversation to a subset of participants (block 48). The side bar conversation begins upon the participant(s) accepting the request from another participant or the automated request/suggestion from the online collaboration tool. The online collaboration tool may facilitate multiple side bar conversations between different sets of participants. In certain embodiments, all of the participants may be participating in a particular side bar conversation without a main conversation occurring. As illustrated in FIGS. 4 and 5, upon entering the side bar conversation, on the screen or graphical user interface the participants are separated into a group of participants in a side bar conversation 50 and a group of participants in a main conversation 52 via graphical user interface designations in accordance with present embodiments. For those participants participating in the main conversation, the group 52 may be larger or more prominent on the screen or graphical user interface as shown in FIG. 4. For those participants participating in the side bar conversation, the group 50 may be larger or more prominent on the screen or graphical user interface as shown in FIG. 5. During the institution of the side bar conversation, the volume of the main conversation may be reduced for the participants in the side bar conversation while the side bar conversation is muted to the participants in the main conversation. Alternatively, during the side bar conversation, if the participant in the side bar conversation is wearing headphones, only one of the earpieces (e.g., left or right) transmits the main conversation (at the normal or reduced volume). In this way, information can be overheard by certain participants, which can facilitate conversation. Data from the side bar conversation can be withheld from the main conversation, which can avoid unnecessary data transmission and improve computer operations.

The method 38 includes returning to the main conversation (block 54). A participant participating in a side bar conversation may end the side bar conversation and return to the main conversation. Alternatively, a participant participating in a side bar conversation may briefly interject into the main conversation while maintaining the side bar conversation. In certain embodiments, a participant in the main conversation may send a request that appears on the screen or graphical user interface of a participant in the side bar conversation asking the participant to return or participate in the main conversation. Managing the participants through the main and side bar conversations continues until the ending of the videotelephone meeting (block 56).

Designating participants for side bar conversations improves the communication during the online collaboration. It enables the main conversation to progress with minimal interruption while enabling other conversations to occur that further the online collaboration.

Figure 6:
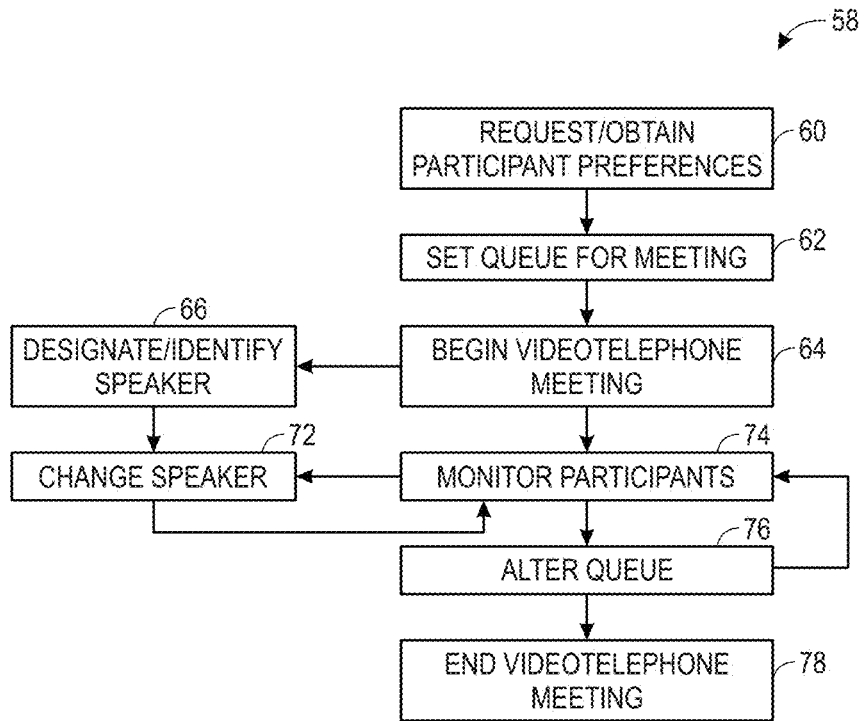
FIG. 6 illustrates a flow diagram of a method for facilitating effective communication in an online collaboration, in accordance with embodiments described herein.

FIG. 6 illustrates a flow diagram of a method 58 for facilitating effective communication in an online collaboration in accordance with present embodiments. One or more steps of the method 58 may be carried out by one or more components of the system 10 illustrated in FIG. 1. One or more of the steps may be performed simultaneously or in a different order from the order shown in FIG. 6. The method 58 includes each participant (upon engaging an online collaboration tool for an online meeting) receiving a request from the online collaboration tool to provide preferences or the online collaboration tool may obtain previously stored preferences for the participant to utilize during the meeting (block 60). The preferences may relate to designating a personality type of the participant or a desired participation level. For example, the participant may be a more pro-active or interactive person who likes to express their views or be heard. Alternatively, the participant may be more observational and wish to only speak after hearing other viewpoints. In certain embodiments, the participant may provide a numeric ranking on a scale (e.g., 1 to 5) related to a desired level of participation, where 1 involves the least amount of involvement in a conversation and 5 the most amount of involvement. In certain embodiments, a participant may provide an indication that they are the leader or facilitator for a meeting. In certain embodiments, participants may designate themselves as active or as an observer. In certain embodiments, the preferences designated by a participant may be visible on a display for the only the participant to see or for all of the participants to see. In certain embodiments, an indicator of how much a participant is participating may be displayed only to the participant or for all of the participants to see. Thus, the indicator may enable a participant to determine if they are dominating a conversation or not participating enough. Metrics for such determinations may be based on different types of audio and/or visual data. For example, audio data that can be correlated to speech may qualify as participation. This may avoid associating mere noise with time spent contributing to a conversation.

Figure 7:
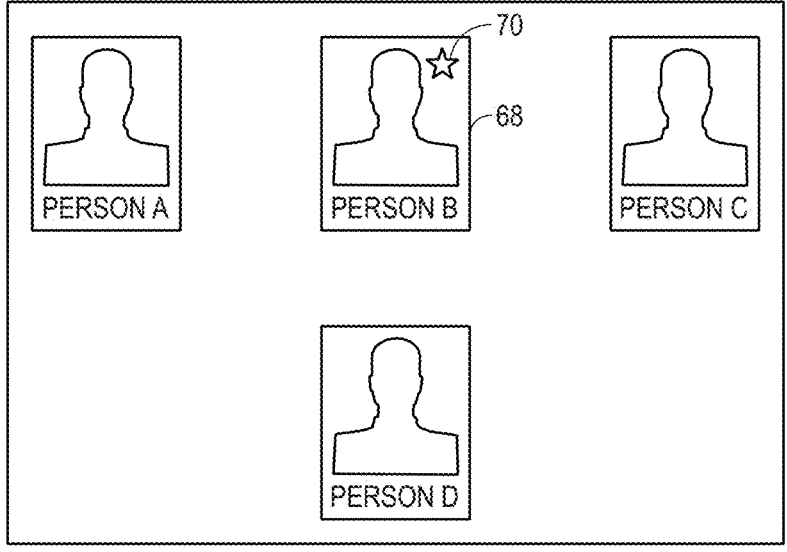
FIG. 7 illustrates a screen or graphical user interface on a participant's computing device designating a speaker in a conversation, in accordance with embodiments described herein.

The method 58 includes setting a queue for a meeting based on the participant preferences (block 62). Those participants who indicated a higher level of involvement will be earlier in the queue while those participants who indicated a lower level of involvement will be later in the queue. Certain participants (i.e., those who preferences indicated a higher level of involvement) may appear in the queue multiple times before another participant's first time. The method 58 includes beginning a videotelephony or videoconference meeting (block 64). For example, multiple participants will join a meeting via the online collaboration tool (e.g., videotelephony or videoconference application) on their respective user devices (e.g., computing devices). Upon beginning the meeting, the method 58 includes, via the online collaboration tool, designating or identifying a speaker (block 66). The first speaker will be the participant designated first in the queue. As indicated in FIG. 7, a graphical user interface 68 for a participant will have an indicator 70 indicating the speaker or designated speaker during the meeting in accordance with present embodiments. The indicator 70 may vary in shape. In certain embodiments, the indicator 70 could be a colored outline about the graphical user interface 68 that is different from the other graphical user interfaces 68 for the other participants. In certain embodiments, the indicator 70 may be text (e.g., the word "speaker"). As the speaker changes, the indicator 70 will appear on the graphical user interface 68 of the speaker.

Returning to FIG. 6, in certain embodiments, the indicator 70 may automatically transfer to the next speaker (e.g., after the present speaker stops talking or after a certain period of time has passed) resulting in a change of speaker (block 72). The method 58 includes monitoring the participants (block 74). During monitoring of the participants, a body language interpreting system may anticipate (e.g., based on the body language or facial expression) that a participant may want to speak and shift the indicator 70 to the graphical user interface 68 for that participant resulting in the change of speaker (block 72). In certain embodiments, the indicator 70 may automatically shift to any participant that begins speaking or that has spoken a threshold level of discernable words (e.g., words that can be detected by an algorithm and not mere noise). Anytime a participant speaks out of sequence from the predetermined queue, the method 58 includes altering the queue (block 76). The queue may be altered to move the current speaker up in the order. In certain embodiments, the queue may be altered to reflect the level involvement of each of the participants in the meeting until that current moment (even if it contradicts the provided participant preferences). In certain embodiments, the indicator 70 may be passed to participants who have not participated to encourage the participant to speak.

In certain embodiments, the online collaboration tool based on the participant preferences and/or monitoring of the participants may automatically shift the indicator 70 between the participants to facilitate the conversation. In some embodiments, a participant indicated as a leader or facilitator may provide an input designating the speaker. In some embodiments, the leader or facilitator may receive or obtain the preferences from all of the participants to base the selection of the speaker on. In some embodiments, the leader or facilitator may be provided a recommended queue for speakers from the online collaboration tool (e.g., based on the participants' preferences). In certain embodiments, a participant in the meeting may provide a request for the indicator 70 to be shifted to them for speaking purposes. Facilitating the participants through the meeting continues until the ending of the videotelephone meeting (block 78).

The method 58 facilitates the online collaboration by facilitating turn-taking. In addition, the method 58 minimizes participants talking over each other and segmented conversation sharing.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for managing an online meeting, comprising:
a processing system comprising one or more hardware processors; and
a non-transitory memory, the non-transitory memory storing instructions that, when executed by the processing system, causes the processing system to perform actions comprising:
monitoring participants during the online meeting to acquire data, wherein monitoring the participants comprises:
acquiring imagery of the participants with respective cameras of respective computing devices utilized by the participants; and
analyzing the imagery for certain eye movements, body movements, or positioning of the participants indicating an intent to want to speak;
altering a queue for the participants to speak in a main conversation during the online meeting, wherein positioning within the queue is based on analysis of the imagery for the intent to speak and participant preferences, and the participant preferences comprise a personality type or a numerical ranking on a scale of a desired participation level; and
adjusting interaction between the participants via user interfaces on the respective computing devices of the participants based on the altered queue.

2. The system of claim 1, wherein the participant preferences comprises the personality type.

3. The system of claim 2, wherein the instructions, when executed by the processing system, further cause the processing system to display, on a respective user interface of a respective computing device associated with a respective participant of the participants, the personality type of the respective participant only.

4. The system of claim 2, wherein the instructions, when executed by the processing system, further cause the processing system to display, on a respective user interface of a respective computing device associated with a respective participant of the participants, a respective personality type of each participant of the participants.

5. The system of claim 1, wherein the participant preferences comprises the numerical ranking on the scale of the desired participation level.

6. The system of claim 5, wherein the instructions, when executed by the processing system, further cause the processing system to display, on a respective user interface of a respective computing device associated with a respective participant of the participants, the numerical ranking on the scale of the desired participation level of the respective participant only.

7. The system of claim 5, wherein the instructions, when executed by the processing system, further cause the processing system to display, on a respective user interface of a respective computing device associated with a respective participant of the participants, a respective numerical ranking on the scale of the desired participation level of each participant of the participants.

8. A computer-implemented method, comprising:
monitoring, via a processing system comprising one or more processors, participants during the online meeting, wherein monitoring the participants comprises:
acquiring imagery of the participants with respective cameras of respective computing devices utilized by the participants; and
analyzing the imagery for certain eye movements, body movements, or positioning of the participants indicating an intent to want to speak;
altering, via the processing system, a queue for the participants to speak in a main conversation during the online meeting, wherein positioning within the queue is based on analysis of the imagery for the intent to speak and participant preferences, and the participant preferences comprise a personality type or a numerical ranking on a scale of a desired participation level; and
adjusting, via the processing system, interaction between the participants via user interfaces on the respective computing devices of the participants based on the altered queue.

9. The computer-implemented method of claim 8, wherein the participant preferences comprises the personality type.

10. The computer-implemented method of claim 9, further comprising causing display of, on a respective user interface of a respective computing device associated with a respective participant of the participants, the personality type of the respective participant only.

11. The computer-implemented method of claim 9, further comprising causing display of, on a respective user interface of a respective computing device associated with a respective participant of the participants, a respective personality type of each participant of the participants.

12. The computer-implemented method of claim 11, wherein the participant preferences comprises the numerical ranking on the scale of the desired participation level.

13. The computer-implemented method of claim 12, further comprising causing display of, on a respective user interface of a respective computing device associated with a respective participant of the participants, the numerical ranking on the scale of the desired participation level of the respective participant only.

14. The computer-implemented method of claim 12, further comprising causing display of, on a respective user interface of a respective computing device associated with a respective participant of the participants, a respective numerical ranking on the scale of the desired participation level of each participant of the participants.

15. One or more non-transitory computer-readable media encoding one or more processor-executable routines, wherein the one or more processor-executable routines, when executed by a processing system comprising one or more processors, cause acts to be performed comprising:

monitoring participants during the online meeting to acquire data, wherein monitoring the participants comprises:

acquiring imagery of the participants with respective cameras of respective computing devices utilized by the participants; and analyzing the imagery for certain eye movements, body movements, or positioning of the participants indicating an intent to want to speak;

altering a queue for the participants to speak in a main conversation during the online meeting, wherein positioning within the queue is based on analysis of the imagery for the intent to speak and participant preferences, and the participant preferences comprise a personality type or a numerical ranking on a scale of a desired participation level; and adjusting interaction between the participants via user interfaces on the respective computing devices of the participants based on the altered queue.

16. The one or more non-transitory computer-readable media of claim 15, wherein the participant preferences comprise the personality type.

17. The one or more non-transitory computer-readable media of claim 16, wherein the one or more processor-executable routines, when executed by the processing system, further cause display of, on a respective user interface of a respective computing device associated with a respective participant of the participants, a respective personality type of each participant of the participants.

18. The one or more non-transitory computer-readable media of claim 15, wherein the participant preferences comprise the numerical ranking on the scale of the desired participation level.

19. The one or more non-transitory computer-readable media of claim 18, wherein the one or more processor-executable routines, when executed by the processing system, further causes display of, on a respective user interface of a respective computing device associated with a respective participant of the participants, the numerical ranking on the scale of the desired participation level of the respective participant only.

20. The one or more non-transitory computer-readable media of claim 18, wherein the one or more processor-executable routines, when executed by the processing system, further cause display of, on a respective user interface of a respective computing device associated with a respective participant of the participants, a respective numerical ranking on the scale of the desired participation level of each participant of the participants.

* * * * *